(12) United States Patent
Kirjavainen

(10) Patent No.: US 6,722,778 B2
(45) Date of Patent: Apr. 20, 2004

(54) EXTRUDER WITH GROOVE ROTOR AND STATOR

(75) Inventor: Kari Kirjavainen, Tampere (FI)

(73) Assignee: Conenor Oy, Espoo (FI)

( * ) Notice: Subject to any disclaimer, the term of this patent is extended or adjusted under 35 U.S.C. 154(b) by 0 days.

(21) Appl. No.: 10/246,429

(22) Filed: Sep. 19, 2002

(65) Prior Publication Data

US 2003/0072211 A1 Apr. 17, 2003

Related U.S. Application Data

(63) Continuation of application No. PCT/FI01/00276, filed on Mar. 20, 2001.

(30) Foreign Application Priority Data

Mar. 21, 2000 (FI) .............................................. 20000664

(51) Int. Cl.[7] .................................................. B29B 7/38
(52) U.S. Cl. ........................................ 366/98; 366/305
(58) Field of Search ............................... 366/69, 96–99, 366/302–305, 307

(56) References Cited

U.S. PATENT DOCUMENTS

| | | | |
|---|---|---|---|
| 2,591,966 A | * | 4/1952 | Rider |
| 2,995,346 A | * | 8/1961 | Samples |
| 3,471,131 A | * | 10/1969 | Fritzweiler et al. |
| 3,517,095 A | | 6/1970 | Dunnington et al. |
| 4,128,342 A | * | 12/1978 | Renk |
| 5,387,386 A | * | 2/1995 | Kirjavainen |
| 6,073,657 A | * | 6/2000 | Hippelainen et al. |
| 6,086,239 A | * | 7/2000 | Jarvenkyla et al. |
| 6,187,237 B1 | * | 2/2001 | Kirjavainen et al. |
| 6,197,239 B1 | * | 3/2001 | Kirjavainen et al. |
| 6,203,740 B1 | * | 3/2001 | Kirjavainen et al. |
| 6,217,206 B1 | * | 4/2001 | Kirjavainen et al. |
| 6,274,071 B1 | * | 8/2001 | Kirjavainen et al. |
| 6,306,326 B1 | * | 10/2001 | Kirjavainen et al. |
| 6,309,574 B1 | * | 10/2001 | Jarvenkyla et al. |
| 6,386,751 B1 | * | 5/2002 | Wootan et al. |
| 6,416,211 B1 | * | 7/2002 | Kirjavainen et al. |
| 6,446,674 B1 | * | 9/2002 | Hippelainen et al. |
| 6,450,429 B1 | * | 9/2002 | Kirjavainen |

FOREIGN PATENT DOCUMENTS

| | | | |
|---|---|---|---|
| GB | 843849 | | 8/1960 |
| GB | 882517 | | 11/1961 |
| WO | 93/04772 | * | 3/1993 |
| WO | 97/21532 | | 6/1997 |
| WO | 99/11374 | | 3/1999 |

\* cited by examiner

Primary Examiner—Charles E. Cooley
(74) Attorney, Agent, or Firm—Young & Thompson

(57) ABSTRACT

A method and an apparatus for extruding material, the material being extruded with an apparatus comprising at least one rotatable rotor and at least one stator, the rotor and the stator comprising grooves, whereby the grooves make the material move through the apparatus when the rotor is rotated. The rotor and stator surfaces facing each other have a wavelike cross-section, and the grooves are so arranged that at the ridge of a wave the depth of a groove reaches its maximum, and at the bottom of a wave the depth reaches its minimum. The bottom of the wave in the rotor is at the ridge of the wave in the stator and vice versa. This makes the material move alternately from a rotor groove to a stator groove, and back.

23 Claims, 3 Drawing Sheets

EXTRUDER WITH GROOVE ROTOR AND STATOR

CROSS REFERENCE TO RELATED APPLICATION

This application is a Continuation of International Application PCT/FI01/00276 filed on Mar. 20, 2001, which designated the U.S. and was published under PCT Article 21(2) in English.

BACKGROUND OF THE INVENTION

The invention relates to a method of extruding material, in which method the material is extruded with an apparatus comprising at least one rotor and at least one stator, the rotor and stator comprising grooves, whereby the grooves make the material move through the apparatus when the rotor is rotated.

The invention further relates to an apparatus for extruding material, the apparatus comprising at least one rotatable rotor and at least one stator, the rotor and the stator comprising grooves, whereby the grooves make the material move through the apparatus when the rotor is rotated.

DESCRIPTION OF THE RELATED ART

WO 97/21532 discloses an apparatus comprising a conical rotor arranged between two stators. Helical grooves are arranged in the rotor and/or the stator for extruding the extrudable material from the extruder as the rotor rotates. Furthermore, the rotor is provided with an opening or openings via which at least part of the extrudable material is arranged to flow. The publication also presents a solution in which the rotor and the stator are provided with grooves, which serve to mix the extrudable material. The apparatus homogenizes and mixes the extrudable material. However, the apparatus does not always melt the material sufficiently efficiently. Furthermore, the apparatus is quite ineffective in treating waste material.

WO 99/11374 discloses a method and an apparatus for treating waste material. The apparatus comprises a conical rotatable rotor arranged between stators. The stators are provided with grooves that serve to discharge the material from the apparatus as the rotor 3 rotates. The rotor is provided with openings through which the material is arranged to pass. The edges of the openings and grooves are sharp, so that when the waste material fed into the apparatus passes through the openings, the sharp edges grind it. This apparatus is extremely efficient in treating waste material. However, the apparatus is quite complex, and the travel and management of the material flows require exact dimensioning and an experienced user.

SUMMARY OF THE INVENTION

It is an object of the present invention to provide a method and an apparatus for efficiently melting and treating the treatable material.

The method of the invention is characterized in that the rotor and stator surfaces facing each other have a wavelike cross-section, and the rotor and stator grooves are so arranged that at the ridge of a wave the depth of a groove reaches its maximum, and at the bottom of a wave the depth of a groove reaches its minimum, and the bottom of the wave in the rotor is at the ridge of the wave in the stator and vice versa, whereby the material moves alternately from a rotor groove to a stator groove, and back.

The apparatus of the invention is characterized in that the rotor and stator surfaces facing each other have a wavelike cross-section, and the rotor and stator grooves are so arranged that at the ridge of a wave the groove reaches its maximum depth, and at the bottom of a wave the groove reaches its minimum depth, and the bottom of the wave in the rotor is at the ridge of the wave in the stator and vice versa, whereby the material is arranged to move alternately from a rotor groove to a stator groove, and back.

The essential idea of the invention is that the rotor and stator surfaces facing each other have a wavelike cross-section, and the rotor and stator are provided with grooves in such a way that at the ridge of a wave the depth of a groove reaches its maximum, and at the bottom of a wave the depth of a groove reaches its minimum. Further, the bottom of the wave in the rotor is at the ridge of the wave in the stator and vice versa, whereby the material is arranged to move alternately from a rotor groove to a stator groove, and back. The wavelike surface between a rotor and a stator makes the material get sheared when it moves from a rotor groove to a stator groove and from a stator groove to a rotor groove. The apparatus has an extremely good melting and mixing efficiency and it can also be used to efficiently treat waste plastic and non-meltable or poorly meltable material. The yield of the apparatus is also very good. It is the idea of a preferred embodiment that the cross-section of the rotor and stator surfaces facing each other is saw-tooth wavelike, whereby the entire apparatus is easy to make by machining, for example. It is the idea of a second preferred embodiment that the pitch angles of the rotor and stator grooves are so arranged that the angle between the longitudinal axes of the grooves is less than 90°. This makes the shearing effect of the grooves extremely good, and the apparatus has an extremely good melting, grinding and mixing performance. The idea of a third preferred embodiment is that the pitch angles of either of the grooves are arranged to be about 90°, whereby the yield of the apparatus is extremely good. It is the idea of a fourth preferred embodiment that the rotor and stator grooves are oblique in the same direction, but their pitch angles are arranged different, whereby the grooves having a wider pitch angle determine the direction of the net flow, and in the grooves having a more low-gradient pitch angle, the material flows backward. This makes the dwell time of the material in the apparatus longer and thus the material can be treated more efficiently. However, the angle between the longitudinal axes of the grooves is so sharp that the melting and mixing performance of the apparatus is extremely good. It is the idea of a fifth preferred embodiment that the cross-section of the grooves is flat in the longitudinal direction. This way the grooves are quite spacious for the flow of mass, rendering the yield of the apparatus good.

BRIEF DESCRIPTION OF THE DRAWINGS

The invention will be described in greater detail in the attached drawings, in which.

DESCRIPTION OF THE PREFERRED EMBODIMENTS

Figure 1:
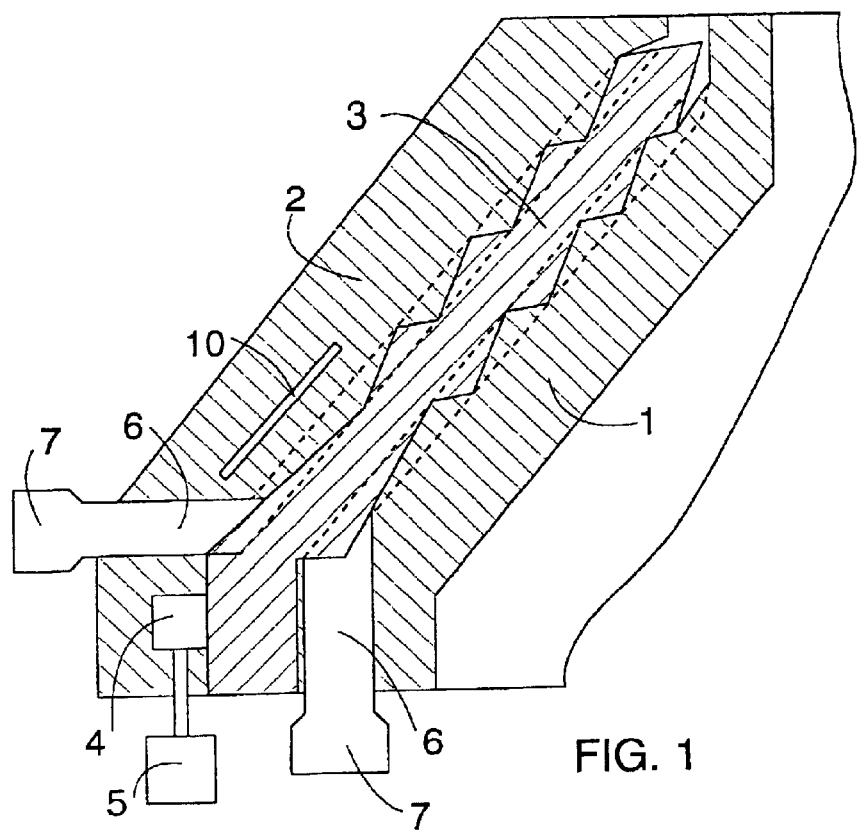
FIG. 1 is a schematic sectional side view of an apparatus of the invention.

FIG. 1 is a schematic sectional side view of an apparatus of the invention. The apparatus comprises an inner stator 1 and an outer stator 2 arranged outside the inner one. At least the outer surface of the inner stator 1 and the inner surface of the outer stator 2 are in the shape of a convergent cone. A rotor 3 in the shape of a convergent cone is arranged between the inner stator 1 and the outer stator 2. The rotor 3 is arranged to move rotatably between the inner stator 1 and the outer stator 2. The rotor 3 is rotated with a motor 5. The motor 5 can be a hydraulic motor or an electric motor, for example, or any other motor fully known per se and suitable for the purpose. The motor 5 is arranged to rotate the rotor 3 by a gear system 4. The gear system 4 allows the speed of rotation of the rotor 3 to be adjusted as desired. However, the gear system 4 is not necessary when for example an electric motor is used, as the speed of rotation of the rotor 3 can be easily adjusted by regulating the speed of rotation of the motor 5 in a manner fully known per se.

The apparatus is further provided with a supply conduit 6 along which the material to be treated is fed to the apparatus. The material to be fed to the supply conduit 6 is supplied with a feeding device 7. The feeding device 7 can be a feed screw or a pump, for example, or any other device fully known per se. The flow rate of the material to be supplied to the supply conduit 6 can be adjusted by means of the feeding device.

The material to be treated flows from the supply conduit 6, which is outside the rotor 3, to grooves 8 outside the rotor 3. As the rotor 3 rotates, the material to be fed is distributed around the rotor 3. When the rotor 3 rotates, the material flows in the rotor 3 groove 8 outwards from the apparatus, i.e. upwards in FIG. 1. That surface of the rotor 3 facing the stator 2 is arranged wavelike. In the embodiment of FIG. 1, the surface is saw-tooth wavelike, i.e. angulate or stepped. Such a surface is quite easy to make by working, for example. FIG. 1 illustrates the bottom of a groove by means of a dashed line. The shape of the bottom of the groove 8 differs from the wavelike shape of the surface, and is preferably substantially straight. In this case the depth of the groove 8 in the rotor 3 reaches its maximum at the ridge of the wave. At the bottom of the wave, the depth of the groove 8 is about zero. The outermost stator 2 comprises corresponding grooves 9, whose bottom may be substantially straight. Because of the wavelike shape of the surface of the outermost stator 2, the depth of the groove of the outermost stator 2 also varies between a maximum value and zero. Consequently, the maximum value is at the ridge of the wave of the stator 2 surface, and the depth of the groove 9 is about zero at the bottom of the wave. The wavelike surface of the rotor and stator is so formed that the bottom of the wave in the stator is at the ridge of the wave of the rotor surface, and the ridge of the wave of the stator surface is at the bottom of the wave of the rotor surface. In this case the depths of the grooves 8 and 9 vary such that at the bottom of the wave, the depth of the groove is about zero, whereby substantially all the material in a groove moves from a rotor groove 8 to a stator groove 9, and, similarly, as the material flows further, from a stator groove 9 to a rotor groove 8, etc.

Material can also be supplied to the inside of the rotor 3 along a supply conduit 6 inside the rotor 3. The inside of the rotor 3 is provided with the same kind of grooves 8 as its outside, and, similarly, the inner stator 1 is provided with the same kind of grooves 9 as the outer stator 2.

When flowing from one groove to another, the material is efficiently sheared, or cut, between the rotor and the stator, and the apparatus thus has an extremely good melting and mixing efficiency. Non-meltable material typically settles in the mid area of a groove, but when flowing from a rotor groove to a stator groove, and vice versa, the edges of the rotor and stator grooves cut off the material flow, whereby working, which shears the non-meltable material, is directed to it. The apparatus is able to treat conventional plastic, such as polyethene or polypropene, extremely efficiently, so that said plastic is easily melted. The yield of the apparatus is extremely good. Furthermore, the apparatus is also able to treat a very poorly meltable material or a completely non-meltable material. Such extremely difficult materials typically include crosslinked polyethene PEX, glass, rubber and generally all waste plastic and other waste material. Consequently, the apparatus is able to melt poorly meltable materials and grind and shear non-meltable materials so fine that they are efficiently mixed with other material thus not impairing the properties of the end product; on the contrary, in some cases, the properties of the end product are even better than those of a product made entirely from the basic material. The extruder according to the invention can also be used for example for processing food stuffs materials, allowing any bones in the material to be sheared fine.

For example in the way shown in FIG. 1, the apparatus can be provided with heating means 10 in the stator 2, for further heating the apparatus to still more efficiently melt the material to be treated. In FIG. 1, the heating means 10 are arranged in the outer stator 2, but heating means can naturally also be arranged in the inner stator 1. The heating means 10 are most preferably arranged in the supply zone of the apparatus, i.e. in the vicinity of the supply conduits 6, whereby the material is melted at quite an early stage in the supply zone.

Figure 2:
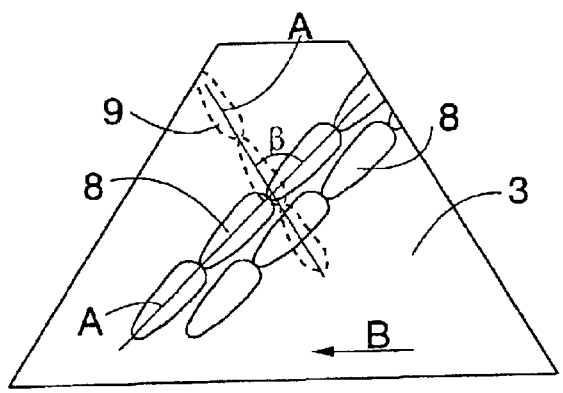
FIG. 2 is a side view of the rotor of the apparatus of FIG. 1.
Figure 3:
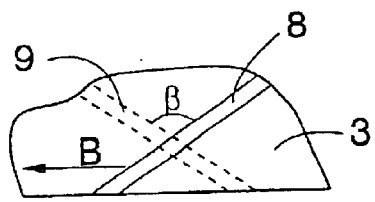
FIG. 3 is a is a schematic side view of a part of the rotor of the apparatus of a second embodiment.

FIG. 2 is a side view of the rotor 3 of an apparatus of the invention. In FIG. 2, a solid line denotes the grooves 8 outside the rotor 3 and a dashed line denotes the grooves 9 inside the outer stator. FIG. 2 also shows the longitudinal axes A of the grooves 8 and 9. For the sake of clarity, FIG. 2 shows only some rotor grooves 8 and only partly one stator groove 9. The pitch angles, or angles of ascent, of the grooves 8 and 9 are so arranged that angle $\beta$ between the longitudinal axes A of the grooves 8 and 9 is less than 90°. In this case the shearing effect provided by the grooves 8 and 9 is extremely efficient. Angle $\beta$ between the longitudinal axes A is preferably less than 60° and most preferably angle $\beta$ is less than 30°. In the supply zone, angle $\beta$ between the longitudinal axes A can also be wider than 90°, whereby the shearing effect of the grooves is not as good as with an acute angle, but, owing to the obtuse angle, in the supply zone the apparatus generates pressure, which presses the material to be treated out of the apparatus. Said obtuse angle is illustrated in FIG. 3. For the sake of clarity, FIG. 3 only shows one rotor groove 8 and only stator groove 9. Furthermore, for the sake of clarity, the appearance of grooves 8 and 9 is shown linearly. In FIGS. 2 and 3, the rotor 3 rotates in the direction of arrow B. The rate of movement of the material flow is arranged to be less than the speed of rotation of the rotor 3. This way the material flows from one rotor groove 8 to several stator grooves 9, and vice versa.

Figure 4:
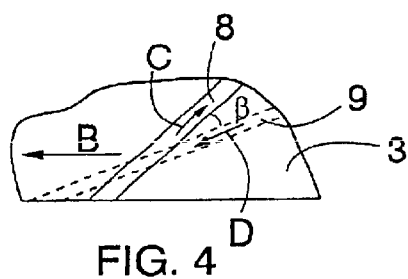
FIG. 4 is a schematic side view of a part of the rotor of the apparatus of a third embodiment.

FIG. 4 shows a solution in which the rotor grooves 8 and the stator grooves 9 are arranged in the same direction, but at different pitch angles. The presentation of FIG. 4 is simplified in the same manner as that of FIG. 3. Consequently, angle β between the longitudinal axes of the grooves is quite sharp, whereby the shearing effect is extremely good. As the rotor 3 rotates in the direction of arrow B, the rotor groove 8 moves the material upward as shown by arrow C. The material is conveyed downward in the stator groove as shown by arrow D, but since the pitch angle of the rotor groove 8 is wider than that of the stator groove 9, the apparatus generates net flow. As the material flows backward in the stator groove 9 as shown by arrow D, the dwell time of the material is extremely long, whereby the material can be worked extremely efficiently.

Figure 5:
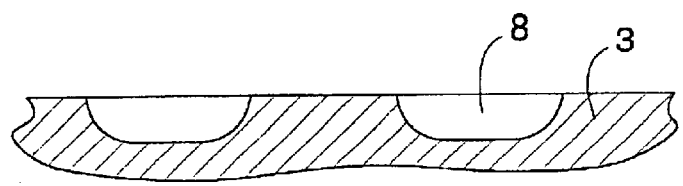
FIG. 5 is a schematic sectional view of the grooves in the direction of their longitudinal axes.

FIG. 5 shows a cross-section of the grooves 8 seen in the direction of their longitudinal axes. The cross-section of the grooves 8 is flat, whereby the volume of the mass flow is considerable. This allows a better yield for the apparatus than if the cross-section were in the shape of a hemi circle, for example. The edges of the grooves 8 and 9 can be arranged steep such that the angle between the tangent of the groove 8, 9 edge and the rotor or stator surface is about 90°, whereby the rotor and stator edges make the material become efficiently sheared between the rotor and the stator.

Figure 6:
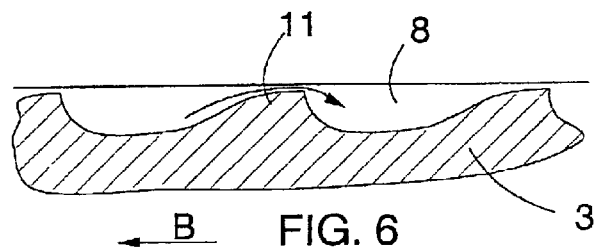
FIG. 6 is a schematic sectional view of the grooves of a second embodiment in the direction of their longitudinal axes, FIG. 7 a schematic planar view of the rotor grooves of an embodiment.

FIG. 6 shows a solution in which ridges 11 between the grooves are oblique, and the clearance between the rotor and the stator is such that material is allowed to flow from an adjacent groove 8 to another in accordance with the arrows shown in FIG. 6. In this case the material flowing over the ridges 11 is subjected to a grinding effect, which works the material extremely efficiently. When flowing over a ridge, the material is also subjected to a stretching effect. If desired, in addition to, or instead of the ridges 11 between the rotor grooves 8, the bevel can be arranged in ridges 12 between the stator grooves 9.

Figure 7:
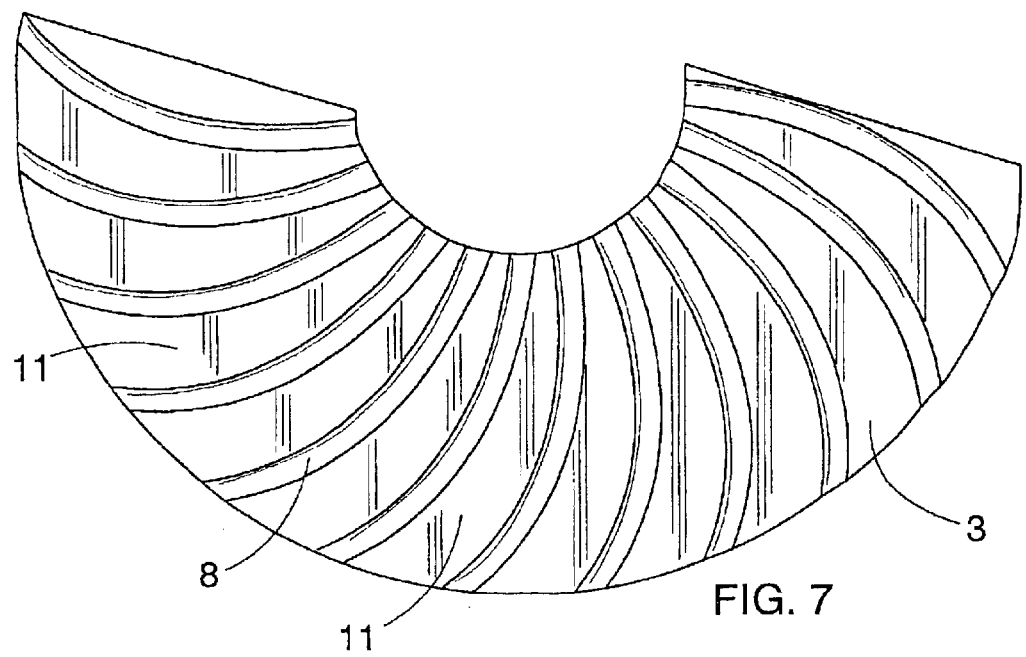

FIG. 7 is a schematic planar view of the rotor 3 grooves 8. The ridges 11 between the grooves 8 can be wider at the root end of the conical rotor 3 than at the tip of the rotor 3. In this case the ridges 3 generate more friction heat at the root end than at the tip of the rotor for melting the plastic. However, the width of the grooves 8 is substantially constant along their entire length.

Figure 8:
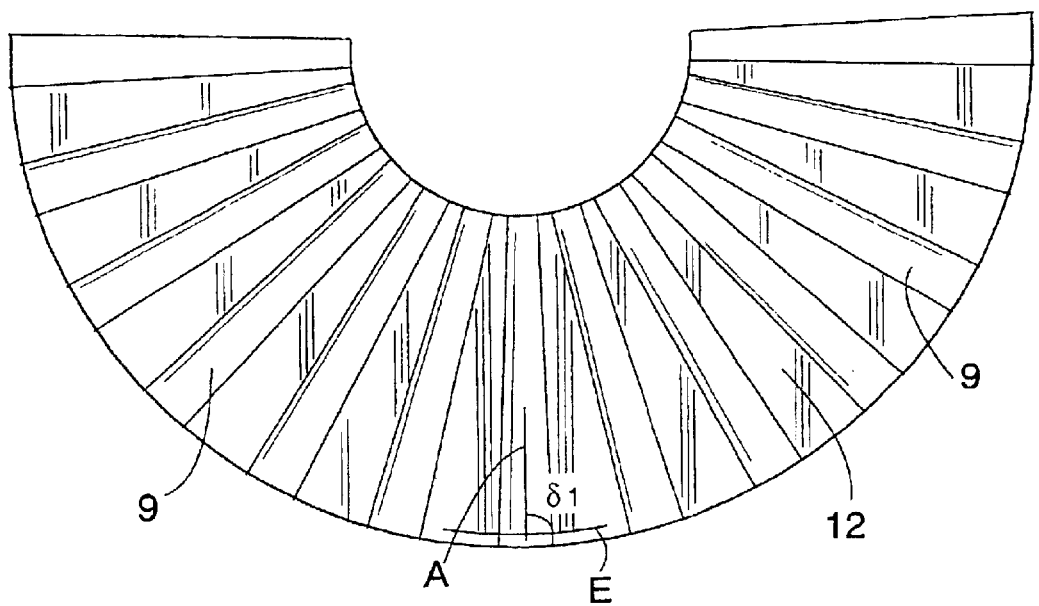
FIG. 8 shows a planar view of the stator grooves of an embodiment in the same way as is shown in FIG. 7.

FIG. 8 shows the grooves 9 of a stator facing the rotor according to FIG. 7, in a planar view as shown in FIG. 7. The pitch angle $\delta_1$, i.e. angle of ascent, of the stator grooves 9, i.e. the angle between the longitudinal axis A and the transverse direction E of the apparatus, is about 90°. In FIG. 7, the pitch angle of the rotor grooves 8 is also quite wide, i.e. for example about 60°. In this case angle β between the longitudinal axes A of the grooves is also quite sharp, and thus the shearing effect of the apparatus extremely good. In said solution, the yield of the apparatus is also extremely good. The ridges 12 between the stator grooves 9 can also be wider at the root end of the stator, i.e. close to the supply zone, than at the tip of the stator. In other words, this way the ridges generate more friction heat in the supply zone than at the stator tip. The stator grooves 9 also narrow from the root end toward the tip.

The invention can be applied as a conventional extruder for melting and mixing normal plastic, and for making extrusion products. The products to be made can be for example pipes, or the apparatus can be used for coating cables, for example. Furthermore, the apparatus is suitable for use in on-line injection moulding, whereby the material can contain fillers, for example. The invention may also be adapted as an on-line compounder, whereby the apparatus serves to directly produce a product containing different materials. The apparatus can comprise a plurality of feeding devices, for example, for feeding different materials to the apparatus. One feeding device can be used for example for feeding polypropene and another for feeding calcium carbonate, whereby the apparatus produces a product made from a mixture of these materials. The apparatus also treats waste plastic especially well, such as crosslinked polyethene PEX or plastics including glass. In the apparatus of the invention, non-meltable waste plastics can also be ground into small particles.

The drawings and the related description are only intended to illustrate the idea of the invention. The details of the invention may vary within the scope of the claims. Accordingly, the apparatus may comprise more than one rotor and more than two stators. However, the solution of the invention can also be implemented with one rotor and one stator. The rotors and stators may also be cylindrical, but preferably at least their surfaces resting against one another are conical. When cylindrical rotors and stators are used, at least the rotor 3 and the outer stator 2 have to be composed of two or more parts to enable the rotors and stators to be installed within each other. A conical solution allows easy adjustment of the clearances by adjusting the distance between the rotor and the stator. The clearance between the rotor and the stator may be quite large. For example with a clearance of 0.5 mm, the apparatus still operates quite well. In the direction of the central axis, a conical apparatus can be built quite short. Furthermore, the angle between a conical rotor and the central axis can be made quite wide. Said angle may thus be wider than 30°, and still the melting and mixing efficiency will be sufficient. The size of the angle is significant for example when multilayer cone extruders are manufactured. Furthermore, the wavelike cross-section of the stator and rotor surfaces does not necessarily have to be angulate, although a surface having a saw-tooth wavelike cross-section is easiest to manufacture.

What is claimed is:

1. A method of extruding material, the method comprising providing an apparatus comprising at least one rotor and at least one stator, the rotor and stator comprising grooves, the rotor and stator surfaces facing each other having an outermost surface with a wavelike cross-section, and the rotor and stator grooves being so arranged that at the ridge of a wave, the depth of a groove reaches its maximum, and at the bottom of a wave, the depth of a groove reaches its minimum, and the bottom of the wave in the rotor is at the ridge of the wave in the stator and vice versa, extruding the material with the apparatus by rotating the rotor and causing the rotor and stator grooves to interact, the interacting grooves making the material to move through the apparatus by subjecting the material to move during extruding from a first rotor groove to a first stator groove, and from the first stator groove to a subsequent rotor groove and from the subsequent rotor groove to a subsequent stator groove.

2. A method as claimed in claim 1, wherein at the bottom of the wave, the depth of the groove is about zero, whereby substantially all the material is subjected to move from a groove of the rotor to a groove of the stator facing it, and vice versa.

3. A method as claimed in claim 1, wherein the cross-section of the rotor and stator surfaces facing each other is saw-tooth wavelike.

4. A method as claimed in claim 1, wherein the shape of the groove bottom is substantially straight.

5. A method as claimed in claim 1, wherein the pitch angles of the grooves are so arranged that the angle between the longitudinal axes of the grooves is less than 90°.

6. A method as claimed in claim 1, wherein the pitch angles of the grooves are so arranged that the angle between the longitudinal axes of the grooves exceeds 90° in the supply zone and is less than 90° after the supply zone.

7. A method as claimed in claim 1, wherein the pitch angle of either the rotor grooves or the stator grooves is arranged to be about 90°, the pitch angle being measured between a longitudinal axis of the groove and a transverse direction of the corresponding stator and rotor.

8. A method as claimed in claim 1, wherein the rotor grooves and stator grooves are arranged to be oblique in the same direction, but their pitch angles are arranged to be different, whereby the grooves having a wider pitch angle determine the direction of the net flow and in the grooves having a more low-gradient pitch angle, the material flows backward.

9. A method as claimed in claim 1, wherein the cross-section of the grooves is flat in the longitudinal direction.

10. A method as claimed in claim 1, wherein at least those surfaces of the rotor and stator that rest against one another are arranged in the shape of a convergent cone.

11. The method of claim 1, wherein, the material is sheared between the rotor and the stator, in moving from each of i) the first stator groove to the subsequent rotor groove and ii) from the subsequent rotor groove to the subsequent stator groove.

12. An apparatus for extruding material, the apparatus comprising:

at least one rotatable rotor and at least one stator, the rotor and the stator comprising grooves, wherein rotation of the rotor causes an interaction of the grooves to make the material move through the apparatus when the rotor is rotated, the rotor and stator surfaces facing each other having outermost surfaces with a wavelike cross-section, and the rotor and stator grooves being so arranged that at the ridge of a wave, the groove reaches its maximum depth, and at the bottom of a wave, the groove reaches its minimum depth, and the bottom of a rotor wave is at the ridge of a stator wave and vice versa, wherein the rotation of the rotor causes the grooves to interact so that material is moved alternately from a first rotor groove to a first stator groove, and from the first stator groove to a subsequent rotor groove and from the subsequent rotor groove to a subsequent stator groove.

13. An apparatus as claimed in claim 12, wherein at the bottom of the wave, the depth of the groove is about zero, whereby substantially all the material moves from a groove of the rotor to a groove of the stator facing it, and vice versa.

14. An apparatus as claimed in claim 12, wherein the cross-section of the rotor and stator surfaces facing each other is saw-tooth wavelike.

15. An apparatus as claimed in claim 12, wherein the shape of the groove bottom is substantially straight.

16. An apparatus as claimed in claim 12, wherein the pitch angles of the grooves are so arranged that the angle between the longitudinal axes of the grooves is less than 90°.

17. An apparatus as claimed in claim 12, wherein the pitch angles of the grooves are so arranged that the angle between the longitudinal axes of the grooves exceeds 90° in the supply zone and is less than 90° after the supply zone.

18. An apparatus as claimed in claim 12, wherein the pitch angle of either the rotor grooves or the stator grooves is about 90°, the pitch angle being measured between a longitudinal axis of the groove and a transverse direction of the corresponding stator and rotor.

19. An apparatus as claimed in claim 12, wherein the rotor grooves and stator grooves are arranged to be oblique in the same direction, but their pitch angles are arranged to be different, whereby the grooves having a wider pitch angle determine the direction of the net flow and in the grooves having a more low-gradient pitch angle, the material is arranged to flow backward.

20. An apparatus as claimed in 12, wherein the cross-section of the grooves is flat in the longitudinal direction.

21. An apparatus as claimed in claim 12, wherein at least those surfaces of the rotor and stator that rest against one another are arranged in the shape of a convergent cone.

22. An apparatus as claimed in claim 12, wherein between the grooves are arranged ridges, at least some of which are oblique along part of their length so as to allow the material to flow from a groove to an adjacent groove.

23. The apparatus of claim 12, wherein, the material is sheared between the rotor and the stator by the rotation of the rotor causing the grooves to interact so that material is moved alternately from the first rotor groove to the first stator groove, and from the first stator groove to the subsequent rotor groove and from the subsequent rotor groove to the subsequent stator groove.

* * * * *